(12) United States Patent
Aoyagi et al.

(10) Patent No.: US 7,060,380 B2
(45) Date of Patent: Jun. 13, 2006

(54) FUEL CELL POWER SUPPLY DEVICE

(75) Inventors: Satoshi Aoyagi, Wako (JP); Hibiki Saeki, Wako (JP); Yutaka Asano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 421 days.

(21) Appl. No.: 10/187,031

(22) Filed: Jun. 28, 2002

(65) Prior Publication Data

US 2003/0008188 A1 Jan. 9, 2003

(30) Foreign Application Priority Data

Jun. 28, 2001 (JP) ............................. 2001-197392
May 22, 2002 (JP) ............................. 2002-148259

(51) Int. Cl.
*H01M 8/04* (2006.01)
(52) U.S. Cl. ............................. 429/22; 429/23; 429/34
(58) Field of Classification Search ................. 429/23, 429/22, 21, 34, 38, 25, 12
See application file for complete search history.

(56) References Cited

U.S. PATENT DOCUMENTS

| 5,334,463 A | 8/1994 | Shindo et al. | |
|---|---|---|---|
| 5,366,820 A * | 11/1994 | Tsutsumi et al. | 429/19 |
| 6,214,484 B1 | 4/2001 | Kauer | |
| 2004/0161850 A1* | 8/2004 | Kato et al. | 436/37 |

OTHER PUBLICATIONS

Standaert, F., et al. "Analytical fuel cell remodeling." *Journal of Power Sources, Elsevier Sequoia S.A. Lausanne, CH.* Dec. 1996; 63(2):221-34.
Standaert, F., et al. "Analytical fuel cell remodeling; non-isothermal fuel cells." *Journal of Power Sources, Elsevier Sequoia S.A. Lausanne, CH.* Feb. 1998; 70(2):181-99.

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

Disclosed is a fuel cell power supply device in which an I-V characteristics estimating unit estimates output current/voltage characteristics (I-V characteristics) of a fuel cell by substituting a linear function (V=F(I)) in which a gradient indicates an internal resistance of the fuel cell and an interception of an axis representing a voltage (V) indicates an open-circuit voltage of the fuel cell calculated by a fuel cell open-circuit voltage calculator for the I-V characteristics. On the basis of the I-V characteristics of the fuel cell estimated by the I-V characteristics estimating unit, a requested output voltage determining unit and a requested output current determining unit determine a requested output voltage and a requested output current, respectively, which are needed to obtain a target total electric energy.

5 Claims, 5 Drawing Sheets

FUEL CELL POWER SUPPLY DEVICE

BACKGROUND OF THE INVENTION

1. Field of the Invention

The present invention relates to a fuel cell power supply device for controlling an amount of reactive gases supplied to a fuel cell depending on an electric energy requested by a load.

2. Description of the Related Art

There have heretofore been employed fuel cell power supply devices which use fuel cells as a power supply device for vehicles such as electric vehicles. An amount of reactive gases (a reducing gas such as hydrogen and an oxidizing gas for extracting electrons by reacting with the reducing gas) to be consumed varies depending on an amount of an output current of the fuel cell. Therefore, it is necessary to control a flow rate of reactive gases so that the amount of reactive gases supplied to the fuel cell is not excessive or insufficient with respect to an electric energy requested by a load such as an electric motor.

One conventional fuel cell power supply device incorporates a control arrangement shown in FIG. 5 for determining a target output current (Ifc_CMD) for a fuel cell on a vehicle. First, a fuel cell vehicle control unit 100 calculates a requested electric energy (PD_CAL) of an electric motor 101 depending on an amount of depression (Ap) of an accelerator pedal and a vehicle speed (Nm).

An output limiting unit 102 calculates a target output (PD_REQ) to limit an upper limit of the requested electric energy (PD_CAL) depending on a capacity of a fuel cell 103 to generate an electric energy. A torque command calculator 104 calculates a torque command (TRQ_CMD) depending on the target output (PD_REQ) and then outputs the torque command to a motor driving unit 105.

On the other hand, a P/I converter 106 applies the target output (PD_REQ) to map data 107, stored in a memory, representing output current/voltage characteristics (I-V characteristics) of the fuel cell 103 to determine the target output current (Ifc_CMD) of the fuel cell 103. A reactive gas supply unit 108 supplies the reactive gases depending on the target output current (Ifc_CMD) to the fuel cell 103 so that the fuel cell 103 outputs a current appropriate to the target output (PD_REQ).

By the above processing, a driving electric energy needed to obtain the target output (PD_REQ) is supplied from the motor driving unit 105 to the electric motor 101, and the reactive gases needed to obtain the target output current (Ifc_CMD) depending on the target output (PD_REQ) are supplied from the reactive gas supply unit 108 to the fuel cell 103.

However, in some cases, the I-V characteristics of the fuel cell 103 vary (shown by a line B in FIG. 5) from an initial state (shown by a line A in FIG. 5) depending on a change in temperature, supply pressure, and humidity of the reactive gases and a change of the fuel cell 103 with time. When the I-V characteristics of the fuel cell 103 vary, the target output current (Ifc_CMD) set for the target output (PD_REQ) is improper, so that the current is excessively or insufficiently outputted from the fuel cell 103.

Therefore, the following processing is performed: A current (Ifc) and a voltage (Vfc) actually outputted from the fuel cell 103 are detected, a difference ($\Delta I$) between the actual current (Ifc) and the target output current (Ifc_CMD) and a difference ($\Delta V$) between the actual voltage (Vfc) and a target output voltage (Vfc_CMD) corresponding to the target output current (Ifc_CMD) in the I-V characteristics are calculated, and the I-V characteristics are corrected depending on the differences ($\Delta I$, $\Delta V$).

However, in the correction of the I-V characteristics as mentioned above, for example, as in the case of abrupt acceleration of the fuel cell vehicle, when a power of the electric motor 101 increases so as to exceed a response speed of the reactive gas supply unit 108 and the actual current (Ifc) and the actual voltage (Vfc) are insufficient with respect to the target output current (Ifc_CMD) and the target output voltage (Vfc_CMD) (in this case, the insufficient current is backed up by discharging an electric energy from a capacitor 109), the calculated differences ($\Delta I$, $\Delta V$) are larger than differences based on the actual initial values of the I-V characteristics of the fuel cell due to a delayed response from the reactive gas supply unit 108.

Accordingly, there are the following disadvantages: The I-V characteristics of the fuel cell 103 are corrected so as to be larger than the actual I-V characteristics. When the target output (PD_REQ) is applied to the corrected I-V characteristics, the target output current (Ifc_CMD) cannot be determined accurately.

SUMMARY OF THE INVENTION

The present invention is made in order to overcome the above disadvantages. It is an object of the present invention to provide a fuel cell power supply device which can accurately determine a requested output current of a fuel cell depending on an electric energy requested by a load even when output current/voltage characteristics of the fuel cell change.

According to the present invention, there is provided a fuel cell power supply device comprising a fuel cell, reactive gas supply means for supplying reactive gases to the fuel cell, supplied-amount regulating means for regulating an amount of reactive gases supplied from the reactive gas supply means to the fuel cell, requested output current determining means for determining a requested output current of the fuel cell depending on a requested electric energy of a load when the load is connected to the fuel cell and is then supplied with an electric energy, and gas supply control means for permitting the supplied-amount regulating means to control the amount of reactive gases supplied to the fuel cell so as to obtain the requested output current.

As a result of various investigations for the purpose of accomplishing the above object, the present inventors discovered that the output current/voltage characteristics of the fuel cell can relatively accurately be approximate to a linear function, in which a gradient indicates an internal resistance of the fuel cell and an intercept of an output voltage axis indicates an open-circuit voltage of the fuel cell, in a range where the fuel cell is ordinarily used.

According to the present invention, the fuel cell power supply device further comprises first storage means for storing data of an internal resistance of the fuel cell, fuel cell open-circuit voltage recognizing means for recognizing an open-circuit voltage of the fuel cell, and output characteristics estimating means for estimating the output current/voltage characteristics of the fuel cell by substituting a linear function in which a gradient indicates the internal resistance of the fuel cell and an intercept of the output voltage axis indicates the open-circuit voltage of the fuel cell for the output current/voltage characteristics. The requested output current determining means determines an output current of the fuel cell obtained by applying the requested electric energy of the load to the linear function as the requested output current.

According to the present invention, on the basis of the open-circuit voltage of the fuel cell recognized by the fuel cell open-circuit voltage recognizing means and data of the internal resistance of the fuel cell stored in the first storage means, the output characteristics estimating means estimates the output current/voltage characteristics of the fuel cell by substituting the linear function in which the gradient indicates the internal resistance of the fuel cell and the intercept of the output voltage axis indicates the open-circuit voltage of the fuel cell for the output current/voltage characteristics. Since the open-circuit voltage of the fuel cell changes depending on a change in actual output current/voltage characteristics of the fuel cell, the linear function, which is estimated as the output current/voltage characteristics of the fuel cell by the output characteristics estimating means, reflects the actual output current/voltage characteristics of the fuel cell. Therefore, even when the output current/voltage characteristics of the fuel cell change, the requested output current determining means can accurately determine the requested output current depending on the requested electric energy by applying the requested electric energy to the linear function.

The fuel cell power supply device further comprises fuel cell current detecting means for detecting an output current of the fuel cell. When the output current of the fuel cell obtained by applying the requested electric energy of the load to the linear function is smaller than a current detected by the fuel cell current detecting means, the requested output current determining means determines the detected current as the requested output current.

According to the present invention, when the requested electric energy of the load increases quickly, due to a time lag until the requested output current determined by the requested output current determining means changes depending on the increase, a current actually outputted from the fuel cell may become larger than the requested output current.

When the current (the actual output current of the fuel cell) detected by the fuel cell current detecting means is larger than the requested output current, the gas supply control means determines the detected current as the requested output current. The amount of reactive gases supplied to the fuel cell is thus increased quickly, preventing the fuel cell from running short of reactive gases.

The fuel cell power supply device further comprises an electric double layer capacitor connected parallel to the fuel cell, second storage means for storing data of an internal resistance of the electric double layer capacitor, capacitor open-circuit voltage recognizing means for recognizing an open-circuit voltage of the electric double layer capacitor, capacitor charged/discharged current recognizing means for dividing a difference between a requested output voltage corresponding to the requested output current in the linear function and the open-circuit voltage of the electric double layer capacitor by the internal resistance of the electric double layer capacitor to recognize a current charged into or discharged from the electric double layer capacitor when an output voltage of the electric double layer capacitor is equivalent to the requested output voltage, and requested output current correcting means for performing at least one of first correction to subtract a discharged current from the requested output current when the capacitor charged/discharged current recognizing means recognizes the current discharged from the electric double layer capacitor and second correction to add a charged current to the requested output current when the capacitor charged/discharged current recognizing means recognizes the current charged into the electric double layer capacitor.

According to the present invention, due to the first correction, the current discharged from the electric double layer capacitor is subtracted from the requested output current to reduce the amount of reactive gases supplied from the gas supply means as much as the discharged current, preventing the reactive gases from being supplied to the fuel cell excessively. Due to the second correction, the current charged into the electric double layer capacitor is added to the requested output current to increase the amount of reactive gases supplied from the gas supply means as much as the charged current, thus preventing the reactive gases from being supplied to the fuel cell insufficiently.

The fuel cell power supply device further comprises fuel cell current detecting means for detecting an output current of the fuel cell. When the requested output current subjected to the first correction or the second correction by the requested output current correcting means is smaller than a current detected by the fuel cell current detecting means, the requested output current determining means determines the detected current as the requested output current.

According to the present invention, in the case where the first correction or the second correction is performed, when the requested electric energy of the load increases quickly, it is possible to prevent the fuel cell from running short of reactive gases.

The fuel cell open-circuit voltage recognizing means recognizes the open-circuit voltage of the fuel cell every predetermined cycle. The output characteristics estimating means estimates the output current/voltage characteristics of the fuel cell every predetermined cycle by substituting the linear function for the characteristics.

According to the present invention, the output characteristics estimating means estimates the output current/voltage characteristics of the fuel cell every predetermined cycle using the linear function based on the open-circuit voltage of the fuel cell recognized every predetermined cycle by the fuel cell open-circuit voltage recognizing means. Therefore, the requested current determining means can accurately determine the requested output current using the linear function updated so as to reflect the latest actual output current/voltage characteristics of the fuel cell.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
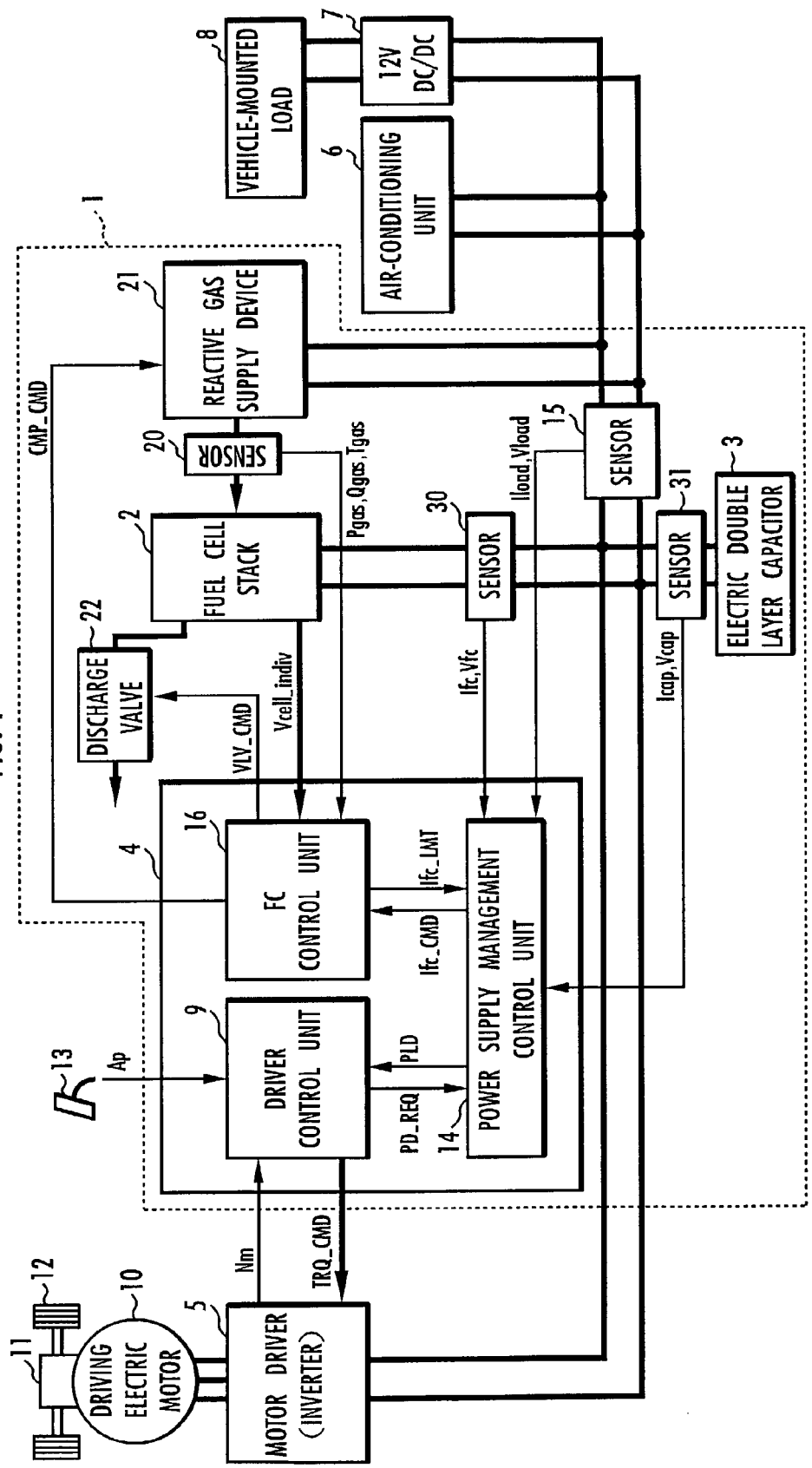
FIG. 1 is a block diagram showing a constitution of a fuel cell power supply device according to the present invention.
Figure 2:
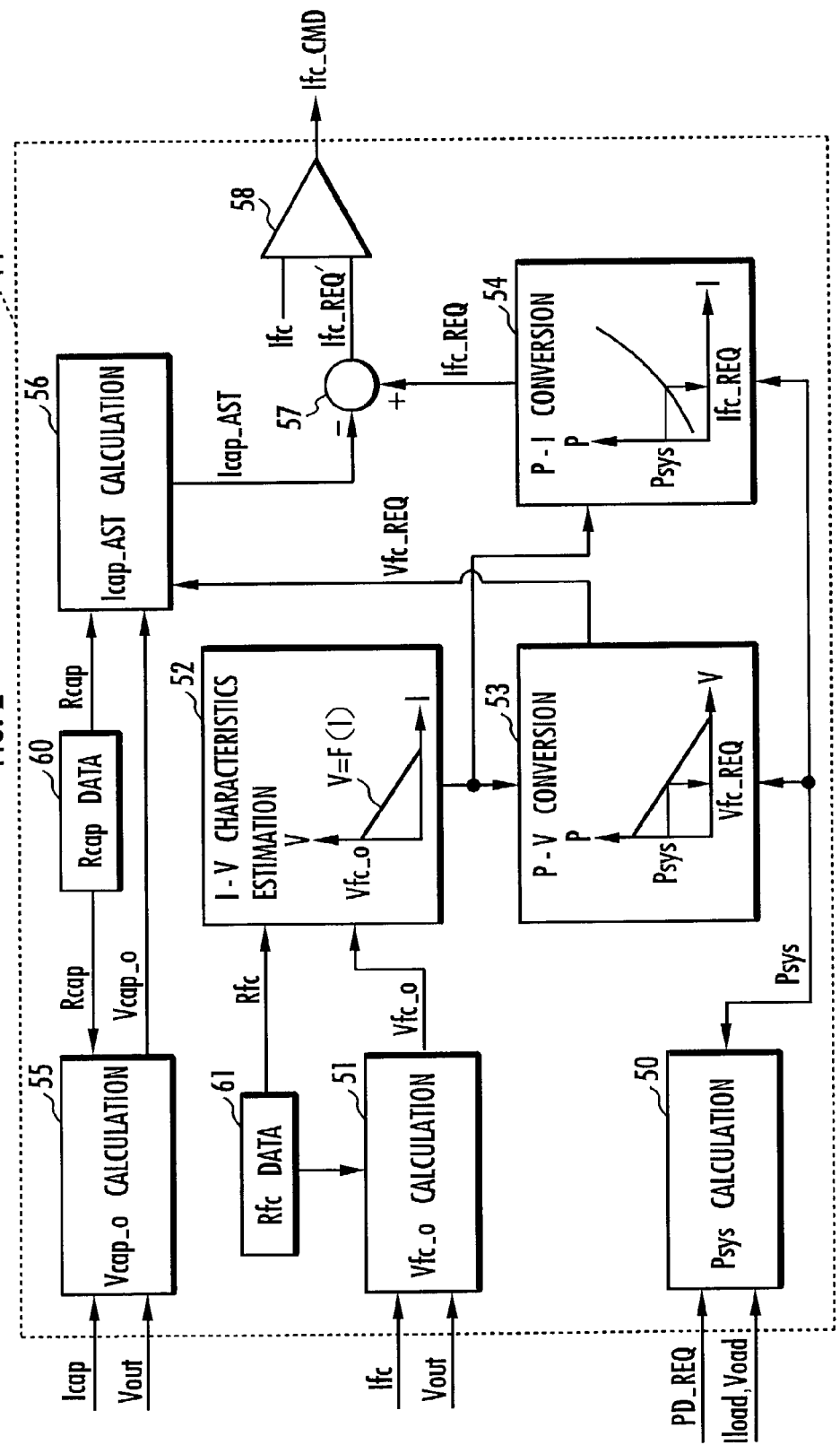
FIG. 2 is a block diagram showing a control arrangement of electric energy management means shown in FIG. 1.
Figure 3:
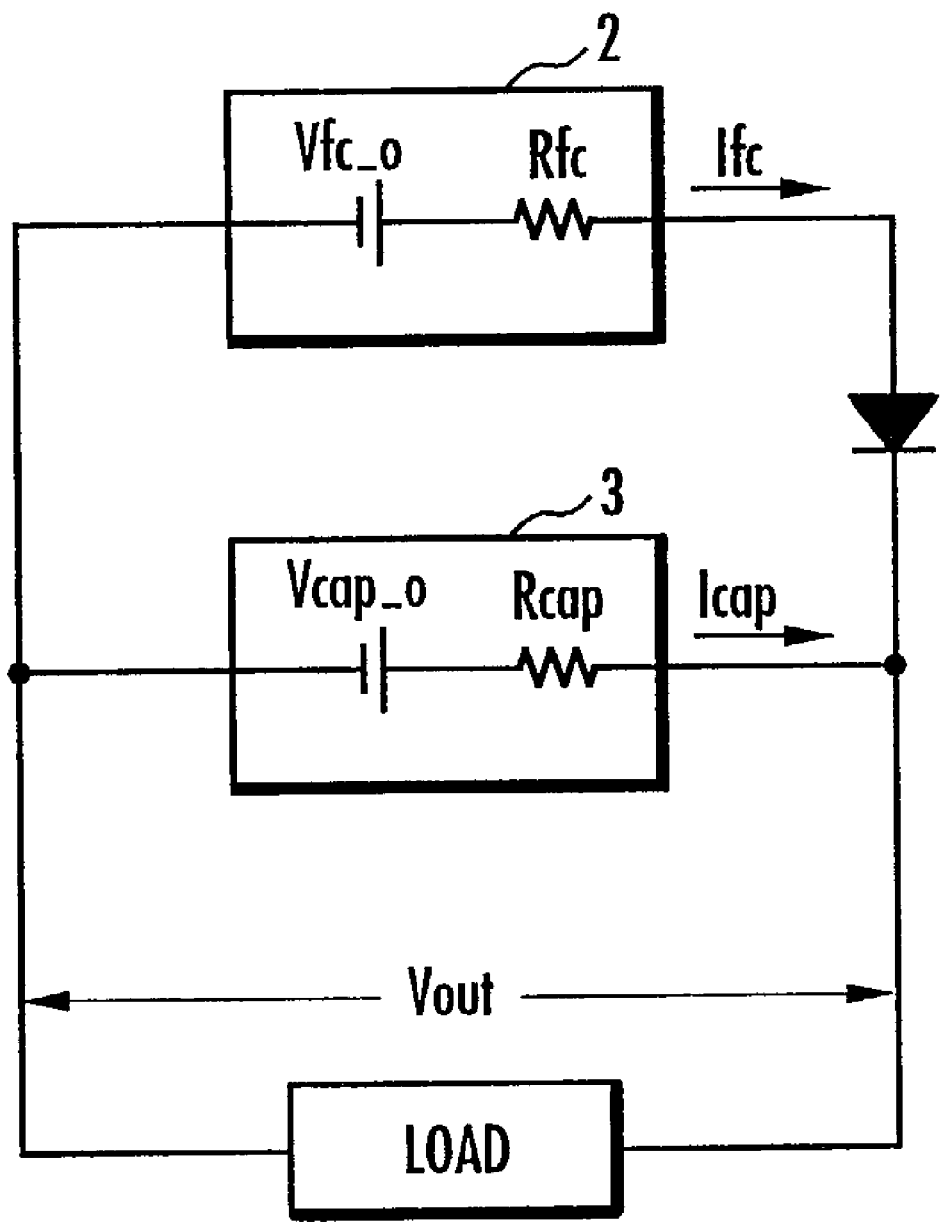
FIG. 3 is an equivalent circuit diagram of the fuel cell power supply device.
Figure 4:
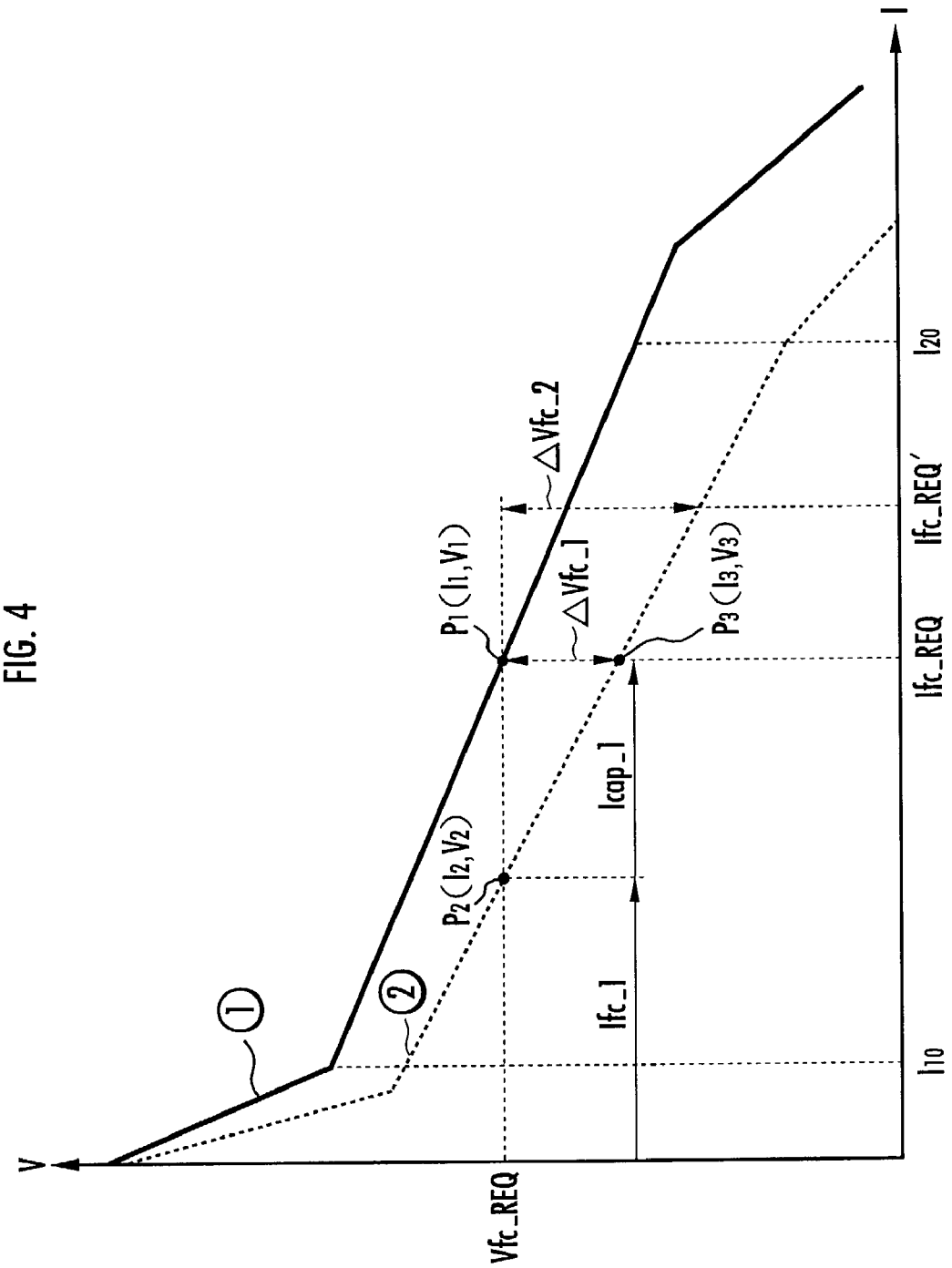
FIG. 4 is a graph showing output current/voltage characteristics of the fuel cell power supply device.
Figure 5:
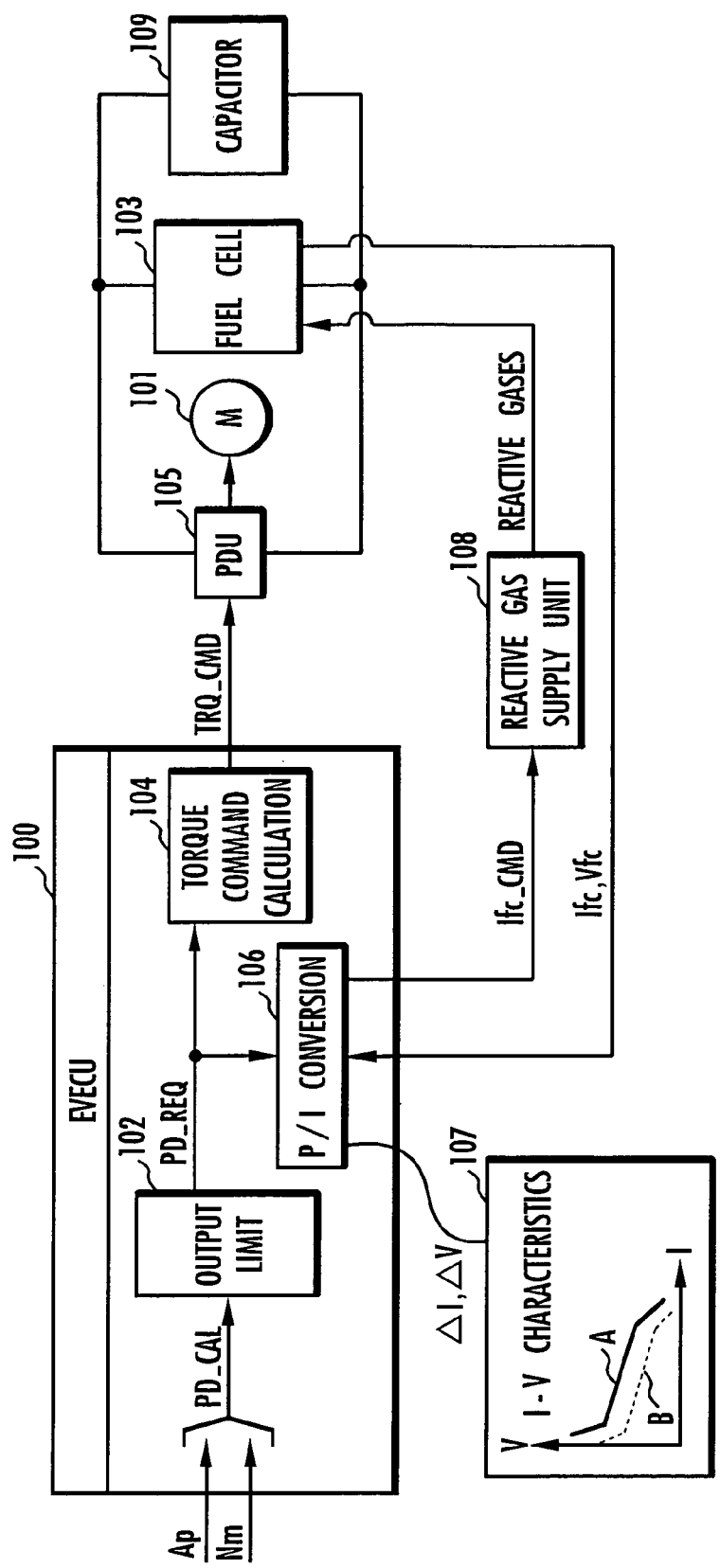
FIG. 5 is a block diagram showing a control arrangement of a conventional fuel cell power supply device.

An embodiment of the present invention will now be described with reference to FIGS. 1 to 4. FIG. 1 is a block diagram showing a constitution of a fuel cell power supply device according to the present invention, FIG. 2 is a block diagram showing a control arrangement of electric energy management means shown in FIG. 1, FIG. 3 is an equivalent circuit diagram of the fuel cell power supply device, and FIG. 4 is a graph showing output current/voltage characteristics (hereinbelow, referred to as I-V characteristics) of a fuel cell stack.

Referring to FIG. 1, a fuel cell power supply device 1 according to the present invention is mounted on a vehicle and functions as a power supply for driving the vehicle. The fuel cell power supply device 1 is a hybrid fuel cell power supply device comprising a fuel cell stack 2 for outputting an electric current based on an electrochemical reaction between reactive gases of hydrogen and air, and an electric double layer capacitor 3 (hereinbelow, referred to as a capacitor 3) connected parallel to the fuel cell stack 2. An output electric energy produced by the fuel cell power supply device 1 is controlled by a controller 4 which comprises a microcomputer, a memory, and other components.

The output electric energy produced by the fuel cell power supply device 1 is supplied to a motor driver 5, an air-conditioning unit 6, and a 12-V load 8 through a DC/DC converter 7. The motor driver 5 controls currents flowing through armatures of an electric motor 10 depending on a torque command (TRQ_CMD) outputted from the driver control unit 9 provided for the controller 4. A drive power generated by the electric motor 10 is transferred to drive wheels 12 through a transmission 11.

The driver control unit 9 outputs a signal indicative of a motor-requested electric energy (PD_REQ), which is required by the motor driver 5, based on an amount of depression (Ap) of an accelerator pedal 13 and a rotational speed (Nm) of the electric motor 10 to the power supply management control unit 14.

The power supply management control unit 14 is supplied with detected signals of a load current (Iload) and a load voltage (Vload) which are detected by a load sensor 15. Based on the detected signals, the power supply management control unit 14 recognizes the electric energy consumed by electric accessories other than the electric motor 10.

The power supply management control unit 14 takes into account an allowable output current (Ifc_LMT) outputted from the fuel cell control unit 16 and indicative of an upper limit for the current that can be supplied from the fuel cell stack 2 and a current (Icap) charged into or discharged from the capacitor 3 and a voltage (Vcap) across the capacitor 3 which are detected by a capacitor sensor 31, determines a target output current (Ifc_CMD) which is a target value for a current outputted from the fuel cell stack 2 depending on the sum of the motor-requested electric energy (PD_REQ) and the electric energy consumed by the electric accessories other than the electric motor 10, and outputs a signal indicative of the target output current (Ifc_CMD) to the fuel cell control unit 16. The power supply management control unit 14 also outputs a signal indicative of an output limit electric energy (PLD) to the driver control unit 9, the output limit electric energy (PLD) representing an upper limit for the electric energy that can be supplied from the fuel cell stack 2.

The fuel cell control unit 16 is supplied with detected signals outputted from a reactive gas sensor 20 and indicating a pressure (Pgas), a flow rate (Qgas), and a temperature (Tgas) of reactive gases (hydrogen and air) supplied to the fuel cell stack 2, and detected signals indicative of states (Vcell_indiv) of individual fuel cells (not shown) that make up the fuel cell stack 2. The fuel cell control unit 16 determines the allowable output current (Ifc_LMT) in consideration of the state of the fuel cell stack 2 as recognized from these detected signals.

The driver control unit 9 outputs the torque command (TRQ_CMD) to the motor driver 5 so as not to exceed the output limit electric energy (PLD) indicated by the power supply management control unit 14. The motor driver 5 controls the armature currents of the electric motor 10 to cause the electric motor 10 to generate torque depending on the torque command (TRQ_CMD).

The fuel cell control unit 16 (including a function as gas supply control means according to the present invention) outputs a signal indicative of a target amount of reactive gases (CMP_CMD) supplied to the fuel cell stack 2 to a reactive gas supply device 21 (corresponding to reactive gas supply means according to the present invention) so that the fuel cell stack 2 will output a current corresponding to the target output current (Ifc_CMD: corresponding to a requested output current according to the present invention) outputted from the power supply management control unit 14.

Consequently, the fuel cell stack 2 is supplied with air and hydrogen at a flow rate according to the target output current (Ifc_CMD). The reactive gas supply device 21 has a mechanism (not shown) for regulating the flow rate at which the reactive gases are supplied. The regulating mechanism such as an air compressor corresponds to supplied-amount regulating means according to the present invention.

Hydrogen supplied from the reactive gas supply device 21 is supplied to hydrogen electrodes of the fuel cell stack 2 through an ejector (not shown) and a humidifier (not shown), and reacts electrically and chemically with oxygen in air supplied to air electrodes of the fuel cell stack 2, producing water which is discharged through a discharge valve 22. The opening of the discharge valve 22 is controlled by a control signal (VLV_CMD) supplied from the fuel cell control unit 16 in order to keep the pressure in the fuel cell stack 2 at a constant gradient depending on the pressures of the supplied air and hydrogen.

The fuel cell stack 2 has a water-cooled cooling unit (not shown). The fuel cell control unit 16 controls the flow rate and the temperature of cooling water supplied to the water-cooled cooling unit depending on the temperature of the cooling water supplied to the water-cooled cooling unit and the temperature of the cooling water discharged from the water-cooled cooling unit.

The fuel cell power supply device 1 also has a fuel cell sensor 30 (including a function as fuel cell current detecting means according to the present invention) for detecting an output current (Ifc) and an output voltage (Vfc) from the fuel cell stack 2. Signals detected by the fuel cell sensor 30 are also supplied to the power supply management control unit 14.

The fuel cell stack 2 and the capacitor 3 are fundamentally held in a directly coupling state except the start time and the stop time of the fuel cell stack 2. In the directly coupling state, when the total electric energy consumed by the electric motor 10 and the electric accessories other than the electric motor 10 is increased to decrease the output voltage of the fuel cell stack 2, a discharge current corresponding to a difference between an open-circuit voltage of the capacitor 3 and the output voltage of the fuel cell stack 2 is supplied to the electric motor 10 and the electric accessories other than the electric motor 10. On the other hand, when the total electric energy consumed is decreased to increase the output voltage of the fuel cell stack 2, a charge current corresponding to the difference between the open-circuit voltage of the capacitor 3 and the output voltage of the fuel cell stack 2 is supplied from the fuel cell stack 2 to the capacitor 3.

Consequently, in both the above cases, the open-circuit voltage of the capacitor 3 becomes equivalent to the output voltage of the fuel cell stack 2. Therefore, it is unnecessary to cause the output voltage of the fuel cell stack 2 to always match an open-circuit voltage of a battery by a large DC/DC converter which can switch a heavy current in a manner similar to a case where the battery, whose open-circuit voltage does not change very much even if the remaining amount of charging electric energy changes, is connected parallel to the fuel cell stack 2.

Accordingly, a small switching device (not shown) may be provided in order to limit the passage of the electric current between the capacitor 3 and the fuel cell stack 2 at the start time and the stop time of the fuel cell stack 2, at which the output current of the fuel cell stack 2 is small.

The constitution and the operation of the power supply management control unit 14 will now be described with reference to FIG. 2. The power supply management control unit 14 comprises a target total electric energy calculator 50, a fuel cell open-circuit voltage calculator 51 (corresponding to fuel cell open-circuit voltage recognizing means according to the present invention), an I-V characteristics estimating unit 52 (corresponding to output characteristics estimating means according to the present invention), a requested output voltage determining unit 53, a requested output current determining unit 54 (constituting requested output current determining means according to the present invention), a capacitor open-circuit voltage calculator 55 (corresponding to capacitor open-circuit voltage recognizing means according to the present invention), a capacitor assist current calculator 56 (corresponding to capacitor charged/discharged current recognizing means according to the present invention), a requested output current correcting unit 57 (corresponding to requested output current correcting means according to the present invention), and a target output current determining unit 58 (constituting requested output current determining means according to the present invention).

The target total electric energy calculator 50 adds a motor-requested electric energy (PD_REQ) to an electric energy consumed by the electric accessories, the electric energy being calculated by multiplying the load current (Iload) by the load voltage (Vload), to calculate a target total electric energy (Psys) serving as a total electric energy required for the operation of the fuel cell vehicle.

The capacitor open-circuit voltage calculator 55 deals with the capacitor 3 so as to replace the capacitor 3 with an equivalent circuit in which reference symbol Vcap_o denotes an open-circuit voltage and reference symbol Rcap denotes an internal resistance as shown in FIG. 3. The capacitor open-circuit voltage calculator 55 calculates the open-circuit voltage (Vcap_o) of the capacitor 3 on the basis of the output current (Icap) and an output voltage (Vout) of the capacitor 3 and data 60 indicating the internal resistance (Rcap) of the capacitor 3 stored in a memory (corresponding to second storage means according to the present invention) using the following equation (1).

$$Vcap\_o = Vout + Icap \times Rcap \quad (1)$$

The capacitor assist current calculator 56 calculates a capacitor assist current (Icap_AST) serving as a current charged into or discharged from the capacitor 3 when the output voltage (Vout) of the fuel cell stack 2 is equivalent to a requested output voltage (Vfc_REQ) depending on the target total electric energy (Psys) using the following equation (2).

$$Icap\_AST = (Vcap\_o = Vfc\_REQ)/Rcap \quad (2)$$

The requested output current correcting unit 57 corrects a requested output current (Ifc_REQ) by subtracting the capacitor assist current (Icap_AST) from the requested output current (Ifc_REQ) depending on the target total electric energy (Psys). Accordingly, when the capacitor assist current (Icap_AST) denotes a positive value, namely, when a current is discharged from the capacitor 3, the requested output current (Ifc_REQ) is reduced as much as the discharged current (the reduction corresponds to first correction according to the present invention), thereby preventing the reactive gases from being supplied to the fuel cell stack 2 excessively.

When the capacitor assist current (Icap_AST) denotes a negative value, namely, when a current is charged into the capacitor 3, the requested output current (Ifc_REQ) is increased as much as the charged current (the increase corresponds to second correction according to the present invention), thereby preventing the reactive gases from being supplied to the fuel cell stack 2 insufficiently.

When a requested output current (Ifc_REQ') corrected by the requested output current correcting unit 57 is equal to or smaller than the actual output current (Ifc) of the fuel cell stack 2 detected by the fuel cell sensor 30, the target output current determining unit 58 outputs the corrected requested output current (Ifc_REQ') as it is as the target output current (Ifc_CMD: corresponding to the requested output current according to the present invention).

On the other hand, when the actual output current (Ifc) of the fuel cell stack 2 detected by the fuel cell current sensor 30 is larger than the requested output current (Ifc_REQ') corrected by the requested output current correcting unit 57, the target output current determining unit 58 outputs the actual output current (Ifc) as the target output current (Ifc_CMD).

Accordingly, the target output current determining unit 58 prevents such a state that the target output current (Ifc_CMD) is smaller than the actual output current (Ifc) of the fuel cell stack 2 to cause a shortage of the reactive gases supplied to the fuel cell stack 2.

In the initial state, the fuel cell stack 2 has I-V characteristics as shown by a line (1) in FIG. 4. In a graph of FIG. 4, the axis of ordinate (V) denotes the output voltage of the fuel cell stack 2 and the axis of abscissa (I) denotes the output current thereof. If the I-V characteristics of the fuel cell stack 2 are always held to the line (1), data of the line (1) is previously stored to the memory and the target total electric energy (Psys) is applied to the I-V characteristics of the line (1), so that the requested output current (Ifc_REQ) and the requested output voltage (Vfc_REQ) of the fuel cell stack 2 which are needed to obtain the target total electric energy (Psys) can be determined.

However, in some cases, the I-V characteristics of the fuel cell stack 2 are actually deviated from those in the initial state due to a change in temperature, pressure, or humidity of the reactive gases supplied to the fuel cell stack 2 or a change of the fuel cell stack 2 with time. When the I-V characteristics of the fuel cell stack 2 are deviated from the initial values, there is a disadvantage in that the amount of reactive gases is excessive or insufficient with respect to the target total electric energy (Psys).

The following case is considered. For example, the line (1) represents the I-V characteristics of the fuel cell stack 2.

At a point $P_1$, the fuel cell stack 2 is equilibrated with the capacitor 3 (in this state, the charge/discharge current of the capacitor 3 is equal to 0) with respect to the requested output current (Ifc_REQ) and the requested output voltage (Vfc_REQ) of the fuel cell stack 2 determined depending on the target total electric energy (Psys). The I-V characteristics of the fuel cell stack 2 are changed from the line (1) indicating the above state to a line (2).

In this case, the output voltage of the fuel cell stack 2 is momentarily equivalent to the requested output voltage (Vfc_REQ) by the output voltage of the capacitor 3 connected parallel to the fuel cell stack 2, the output current of the fuel cell stack 2 is reduced to a value shown by reference symbol Ifc_1, and a current (Icap_1) corresponding to the amount of reduction with respect to the requested output (Ifc_REQ) is discharged from the capacitor 3.

After that, the output voltage of the capacitor 3 (=the output voltage of the fuel cell stack 2) is reduced to the requested output current (Ifc_REQ) by discharging and the fuel cell stack 2 is then equilibrated with the capacitor 3 at a point $P_3$. An output voltage ($V_3$) of the fuel cell stack 2 in the equilibrating state at the point $P_3$ is lower than an output voltage ($V_1$) in the equilibrating state at the point $P_1$. In this case, since the output current (Icap) of the capacitor 3 is equal to 0 in the equilibrating state, the open-circuit voltage (Vcap_o) of the capacitor 3 calculated by the capacitor open-circuit voltage calculator 55 using the foregoing equation (1) is equivalent to the output voltage (Vout) of the fuel cell stack 2.

Accordingly, in the foregoing equation (2), Vcap_o<Vfc_REQ. The calculated capacitor assist current (Icap_AST) indicates a negative value. Therefore, the requested output current correcting unit 57 performs the correction to increase the requested output current (Ifc_REQ→Ifc_REQ').

However, when the correction is performed as mentioned above, a difference between the requested output voltage (Vfc_REQ) and the output voltage (Vfc) of the fuel cell stack 2 increases from ΔVfc_1 to ΔVfc_2. As a result, the correction to increase the requested output current (Ifc_REQ) is further performed, so that the reactive gases are excessively supplied to the fuel cell stack 2. When the reactive gases are excessively supplied to the fuel cell stack 2, the electric energy is wasted by the reactive gas supply device 21 (refer to FIG. 1) and the humidity in the fuel cell stack 2 decreases to dry an electrolytic membrane of the fuel cell stack 2, resulting in a deterioration in performance of the fuel cell stack 2.

On the other hand, when the I-V characteristics of the fuel cell stack 2 are deviated from the line (1) in the normal direction of the axis of voltage (V) (upward in FIG. 4), Vcap_o>Vfc_REQ, so that the calculated capacitor assist current (Icap_AST) denotes a positive value in the foregoing equation (2).

Therefore, the requested output current correcting unit 57 performs the correction to decrease the requested output current (Ifc_REQ). Actually, the charging current is supplied to the capacitor 3 in order to increase the output voltage of the capacitor 3. Accordingly, the requested output current (Ifc_REQ) is insufficient with respect to the target total electric energy (Psys), resulting in a shortage of the reactive gases supplied to the fuel cell stack 2.

In order to inhibit an effect of a change of the I-V characteristics of the fuel cell stack 2 and then determine the requested output current (Ifc_REQ) and the requested output voltage (Vfc_REQ), the I-V characteristics estimating unit 52 deals with the fuel cell stack 2 so as to replace the fuel cell stack 2 with an equivalent circuit having an open-circuit voltage (Vfc_o) and an internal resistance (Rfc) as shown in FIG. 3, thereby estimating the I-V characteristics of the fuel cell stack 2.

In this instance, as shown in FIG. 4, the I-V characteristics of the fuel cell stack 2 are approximate to a line whose gradient is substantially fixed in a range where the fuel cell stack 2 is ordinarily used ($I_{10}$ to $I_{20}$). Even if the I-V characteristics of the fuel cell stack 2 change due to a change with time, a change in gradient of the I-V characteristics is relatively small in this range.

The I-V characteristics estimating unit 52 estimates the I-V characteristics of the fuel cell stack 2 by substituting a linear function in which a gradient denotes the internal resistance (Rfc) in the initial state and an intercept of the voltage axis (V axis) denotes an open-circuit voltage (Vfc_o) of the fuel cell stack 2 and which is expressed by the following equation (3) for the I-V characteristics:

$$V = F(I) \quad (3)$$
$$= Rfc \times I + Vfc\_o$$

where, reference symbol V denotes the output voltage of the fuel cell stack 2 and reference symbol I denotes the output current of the fuel cell stack 2.

In this instance, on the basis of output current (Ifc) and the output voltage (Vout) of the fuel cell stack 2 and data 61 indicative of the internal resistance (Rfc) of the fuel cell stack 2, stored in a memory (corresponding to first storage means according to the present invention), the fuel cell open-circuit voltage calculator 51 calculates the open-circuit voltage (Vfc_o) of the fuel cell stack 2 using the following equation (4).

$$Vfc\_o = Vout + Ifc \times Rfc \quad (4)$$

The fuel cell open-circuit voltage calculator 51 calculates the open-circuit voltage (Vfc_o) of the fuel cell stack 2 every predetermined control cycle (corresponding to a predetermined cycle according to the present invention) using the above equation (4). Based on the calculated open-circuit voltage (Vfc_o), the I-V characteristics estimating unit 52 estimates the I-V characteristics of the fuel cell stack 2 using the foregoing equation (3).

Accordingly, the I-V characteristics estimating unit 52 updates the linear function represented by the equation (3) by reflecting the actual change if the I-V characteristics of the fuel cell stack 2 every control cycle. Consequently, the I-V characteristics estimating unit 52 can accurately estimate the I-V characteristics of the fuel cell stack 2.

On the basis of the I-V characteristics of the fuel cell stack 2 estimated by the I-V characteristics estimating unit 52, the requested output voltage determining unit 53 can accurately determine the requested output voltage (Vfc_REQ) depending on the target total electric energy (Psys). On the basis of the I-V characteristics of the fuel cell stack 2 estimated by the I-V characteristics estimating unit 52, the requested output current determining unit 54 can accurately determine the requested output voltage (Ifc_REQ) depending on the target total electric energy (Psys).

Accordingly, it is possible to inhibit the foregoing excessive or insufficient supply of reactive gases to the fuel cell stack 2 caused by the deviation of the actual I-V characteristics of the fuel cell stack 2 from the I-V characteristics of the fuel cell stack 2 used for the calculation of the requested output current (Ifc_REQ).

The present embodiment has described the fuel cell power supply device having the fuel cell stack 2 and the capacitor 3 connected parallel to the fuel cell stack 2. According to the present invention, even if the device does not have the capacitor 3, the I-V characteristics of the fuel cell stack 2 are estimated by substituting the linear function represented by the foregoing equation (3) for the I-V characteristics, so that the requested output current (Ifc_REQ) depending on the target total electric energy (Psys) can be determined accurately.

According to the present embodiment, the requested output current correcting unit 57 performs the correction to increase or decrease the requested output current (Ifc_REQ) using the capacitor assist current (Icap_AST). The advantages of the present invention are effective even when only the correction to increase the requested output current is performed, when only the correction to decrease the current is performed, or when the correction is not performed.

According to the present embodiment, the target output current determining unit 58 sets the target output current (Ifc_CMD) so as not to be equal to or lower than the actual output current (Ifc) of the fuel cell stack 2. The advantages of the present invention are effective even when the present device does not have the target output current determining unit 58.

Although a certain preferred embodiment of the present invention has been shown and described in detail, it should be understood that various changes and modifications may be made therein without departing from the scope of the appended claims.

What is claimed is:

1. A fuel cell power supply device comprising:
   a fuel cell;
   reactive gas supply means for supplying reactive gases to said fuel cell;
   supplied-amount regulating means for regulating an amount of reactive gases supplied from said reactive gas supply means to the fuel cell;
   requested output current determining means for determining a requested output current of the fuel cell depending on a requested electric energy of a load when said load is connected to the fuel cell and is then supplied with an electric energy;
   gas supply control means for permitting said supplied-amount regulating means to control the amount of reactive gases supplied to the fuel cell so as to obtain said requested output current;
   first storage means for storing data of an internal resistance of the fuel cell;
   fuel cell open-circuit voltage recognizing means for recognizing an open-circuit voltage of the fuel cell; and
   output characteristics estimating means for estimating output current/voltage characteristics of the fuel cell by substituting a linear function in which a gradient indicates the internal resistance of the fuel cell and an intercept of an output voltage axis indicates the open-circuit voltage of the fuel cell for the output current/voltage characteristics,
   wherein said requested output current determining means determines an output current of the fuel cell, which is obtained by applying the requested electric energy of the load to said linear function, as the requested output current.

2. The fuel cell power supply device according to claim 1, further comprising:
   fuel cell current detecting means for detecting an output current of the fuel cell,
   wherein when the output current of the fuel cell obtained by applying the requested electric energy of the load to the linear function is smaller than a current detected by said fuel cell current detecting means, the requested output current determining means determines the detected current as the requested output current.

3. The fuel cell power supply device according to claim 1, further comprising:
   an electric double layer capacitor which is connected parallel to the fuel cell;
   second storage means for storing data of an internal resistance of said electric double layer capacitor;
   capacitor open-circuit voltage recognizing means for recognizing an open-circuit voltage of the electric double layer capacitor;
   capacitor charged/discharged current recognizing means for dividing a difference between the requested output voltage, obtained by applying the requested output current to the linear function, and the open-circuit voltage of the electric double layer capacitor by the internal resistance of the electric double layer capacitor to recognize a current charged into or discharged from the electric double layer capacitor when an output voltage of the electric double layer capacitor is equivalent to the requested output voltage; and
   requested output current correcting means for performing at least one of a first correction to subtract a discharged current from the requested output current when said capacitor charged/discharged current recognizing means recognizes the current discharged from the electric double layer capacitor and a second correction to add a charged current to the requested output current when the capacitor charged/discharged current recognizing means recognizes the current charged into the electric double layer capacitor.

4. The fuel cell power supply device according to claim 3, further comprising:
   fuel cell current detecting means for detecting an output current of the fuel cell,
   wherein when the requested output current subjected to said first correction or said second correction by said requested output current correcting means is smaller than a current detected by said fuel cell current detecting means, the requested output current determining means determines the detected current as the requested output current.

5. The fuel cell power supply device according to any one of claims 1 or 2, wherein
   the fuel cell open-circuit voltage recognizing means recognizes the open-circuit voltage of the fuel cell every predetermined cycle and
   the output characteristics estimating means estimates the output current/voltage characteristics of the fuel cell by substituting the linear function for the output current/voltage characteristics every said predetermined cycle.

* * * * *